United States Patent [19]
Carter et al.

[11] Patent Number: 5,414,240
[45] Date of Patent: May 9, 1995

[54] ELECTRICALLY HEATABLE TRANSPARENCY

[75] Inventors: Thomas M. Carter, Allison Park; Charles R. Coleman; Russell C. Criss, both of Pittsburgh; Frank H. Gillery, Allison Park; Pamela L. Martino; Amy M. Roginski, both of New Kensington; John A. Winter, Pittsburgh; Terry L. Wolfe, Allison Park; James J. Finley, Pittsburgh, all of Pa.

[73] Assignee: PPG Industries, Inc., Pittsburgh, Pa.

[21] Appl. No.: 290,225

[22] Filed: Dec. 27, 1988

[51] Int. Cl.$^6$ .............................. H05B 3/00
[52] U.S. Cl. ............................ 219/203; 219/547
[58] Field of Search ............. 219/203, 522, 543, 547; 338/306; 65/30.14; 428/34.6

[56] References Cited

U.S. PATENT DOCUMENTS

| | | | |
|---|---|---|---|
| Re. 33,297 | 8/1990 | Ramus et al. | 65/42 |
| 3,752,348 | 8/1973 | Dickason et al. | 219/203 |
| 3,865,680 | 2/1975 | Reese et al. | 161/125 |
| 4,265,650 | 5/1981 | Reese et al. | 65/104 |
| 4,323,726 | 4/1982 | Criss et al. | 174/68.5 |
| 4,361,751 | 11/1982 | Criss et al. | 219/522 |
| 4,385,226 | 5/1983 | Sauer | 219/522 |
| 4,388,522 | 6/1983 | Boaz | 219/522 |
| 4,407,847 | 10/1983 | Boaz | 427/35 |
| 4,443,691 | 4/1984 | Sauer | 219/522 |
| 4,543,466 | 9/1985 | Ramus | 219/203 |
| 4,610,771 | 9/1986 | Gillery | 204/192.1 |
| 4,654,067 | 3/1987 | Ramus et al. | 65/107 |
| 4,666,492 | 5/1987 | Thimons et al. | 65/29 |
| 4,668,270 | 5/1987 | Ramus | 65/106 |
| 4,718,932 | 1/1988 | Pharms | 65/42 |
| 4,725,710 | 2/1988 | Ramus et al. | 219/203 |
| 4,743,741 | 5/1988 | Ramus | 219/543 |
| 4,744,844 | 5/1988 | Hurst | 156/101 |
| 4,786,784 | 11/1988 | Nikodem et al. | 219/543 |
| 4,820,902 | 4/1989 | Gillery | 219/203 |

FOREIGN PATENT DOCUMENTS 1082064 9/1967 United Kingdom ............ 65/30.14

Primary Examiner—Bruce A. Reynolds
Assistant Examiner—Michael D. Switzer
Attorney, Agent, or Firm—Andrew C. Siminerio

[57] ABSTRACT

An electrically heatable windshield with a hidden bus bar configuration. A border of opaque ceramic material, preferably a lead borosilicate enamel, is bonded to an interior surface of the transparency about its periphery. Opposing electroconductive bus bars, preferably a low frit content silver-containing ceramic material, are bonded to the ceramic material so that the entire inner edge of the bus bar overlays a portion of the ceramic material and is spaced from the inner edge of the border, providing an intermediate portion of the border between the bus bars and transparency surface that is not covered by the bus bars. An electro-conductive coating is applied to the transparency to interconnect the bus bars and covers to the inner surface of the transparency, the bus bars and the intermediate portion of the ceramic material border so that electric current flowing between the bus bars must flow through the portion of the coating that covers the intermediate portion of the border.

26 Claims, 1 Drawing Sheet

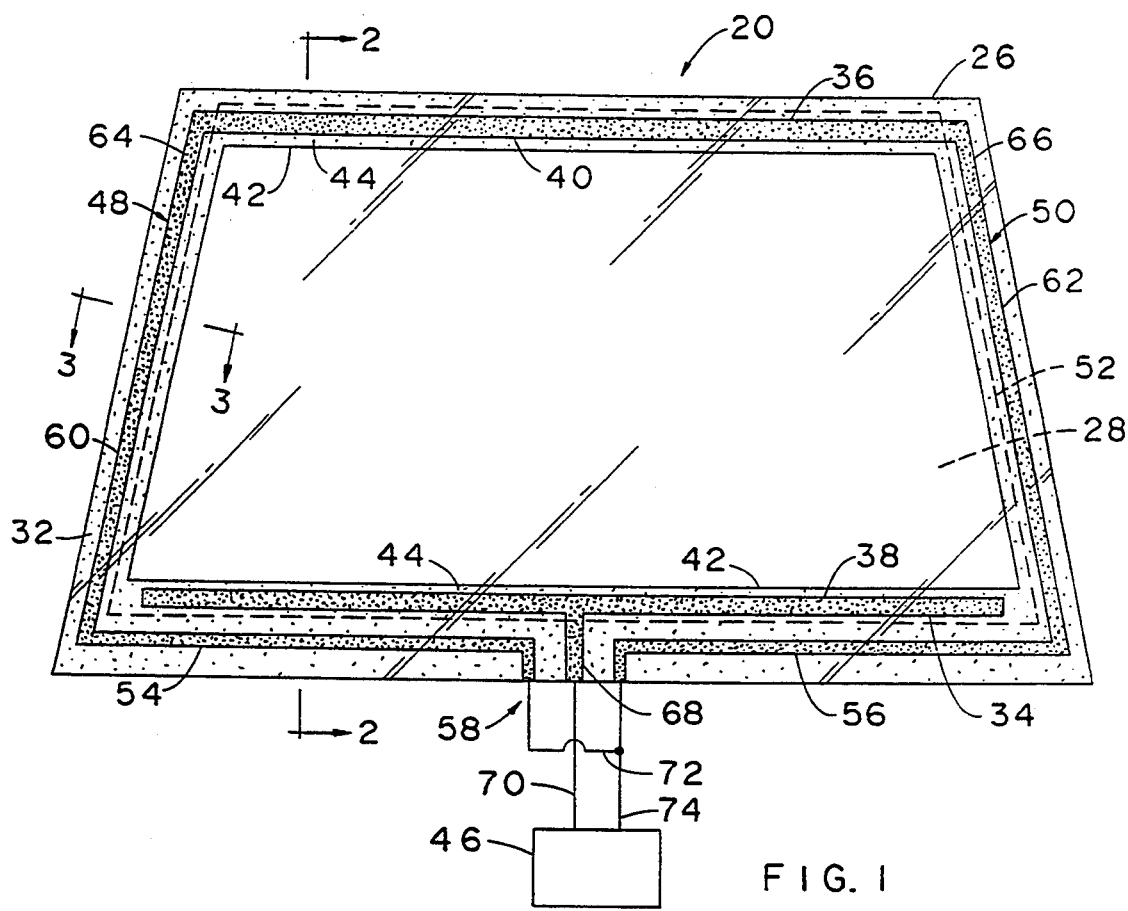
FIG. 1
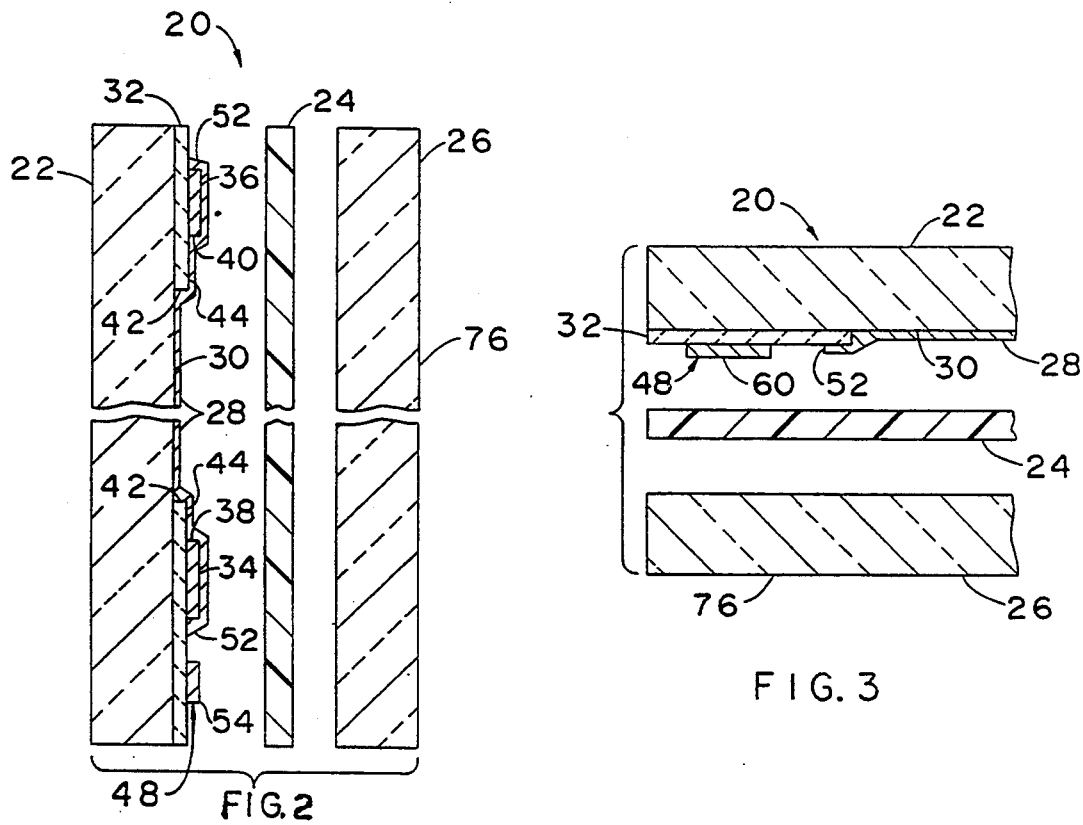
FIG. 2
FIG. 3

ELECTRICALLY HEATABLE TRANSPARENCY

BACKGROUND OF THE INVENTION

FIELD OF INVENTION

This invention relates to an electrically heatable transparency and in particular to an electrically heatable windshield with a hidden bus bar and lead arrangement.

TECHNICAL CONSIDERATIONS

It has been known to pass electrical current through a transparent conductive coating on the surface of a transparency to raise its temperature. Generally, a source of electrical potential is connected to the coating by way of a pair of bus bars, each positioned along opposite sides of the transparency to be heated. The bus bars may be comprised of metallic foil strips but, in the case of glass transparencies, they preferably are comprised of a metallic, ceramic frit material fused onto a surface of the transparency. Electroconductive leads are positioned along the transparency surface to interconnect the bus bars to the electrical power source.

In fabricating heatable transparencies and, in particular heatable windshields, a ceramic enamel band may be used to underlay a portion or all of the bus bars and/or leads in an attempt to hide them from view when the windshield is observed from outside the vehicle. However, it has been found that the bus bars and leads can be seen through the ceramic band as a discoloration of the band due to the bus bar and lead material mixing with the ceramic enamel band.

Positioning the bus bar and leads completely on the ceramic enamel band to hide these members presents another problem. The electro-conductive coating used for heating the transparency must bridge the portion of the ceramic band between the bus bar and the glass sheet surface. It has been found that the surface resistance of the electroconductive coating material increases over this area, resulting in higher temperatures at the band and a possibility of overheating within the windshield which may damage the plastic interlayer and, in severe cases, damage the laminated windshield, thus adversely affecting its occupant retention capability.

It would be advantageous to provide a heatable windshield which completely hides the leads and/or bus bars from the exterior of the vehicle, as well as an arrangement that minimizes overheating within the windshield due to the electroconductive coating which extends over portions of the ceramic band.

PATENTS OF INTEREST

U.S. Pat. Nos. 3,752,348 to Dickason et al.; 4,543,466, 4,668,270 and 4,743,741 to Ramus; 4,654,067 to Ramus et al.; 4,718,932 to Pharms, and 4,744,844 to Hurst teach a heatable windshield and method for making same. The bus bars and electroconductive coating of the windshield are positioned on an interior surface within the windshield assembly. U.S. Pat. Nos. 4,543,466, 4,654,067 and 4,744,844 disclose bus bar configurations with portions of the bus bar completely on a ceramic paint band applied about the periphery of the glass sheet.

U.S. Pat. Nos. 4,323,726 and 4,351,751 to Criss et al. teach a bus bar assembly for an electroconductive laminated window which has a relatively low electrical resistance and the ability to uniformly distribute current to an electroconductive pattern.

U.S. Pat. Nos. 4,388,522 and 4,407,847 to Boaz teach an electrically heated backlight arrangement with closely spaced electrical resistance heater lines to heat the glass sheet. U.S. Pat. No. 4,388,522 discloses a heating grid arrangement with the bus bars positioned completely on an opaque ceramic band on the backlight.

SUMMARY OF THE INVENTION

The present invention teaches an electrically heatable laminated transparency with a hidden bus bar configuration. A border of opaque ceramic material is bonded to an interior surface of the transparency about its periphery and opposing electroconductive bus bars are bonded to the ceramic material so that the entire inner edge of the bus bar overlays a portion of the ceramic material and is spaced from the inner edge of the border, providing an intermediate portion of the border between the bus bars and transparency surface that is not covered by the bus bars. An electroconductive coating is applied to the transparency to interconnect the bus bar's. The coating covers the inner surface of the transparency, the bus bars, and the intermediate portion of the ceramic material border so that electric current flowing between the bus bars must flow through the portion of the coating that covers the intermediate portion of the border. Any increase in the measured surface resistance of the coating over the intermediate portion, when compared to the coating's surface resistance on the transparency surface, is maintained at a level equal to or less than about 50% of the coating's surface resistance measured on the transparency surface. In one particular embodiment of the invention, the border material is an enamel that is heated and bonded to the surface of the transparency under temperatures and time-at-temperature conditions that do not adversely affect the optical properties of the transparency while providing a surface smoothness that will maintain any increase in the coating's surface resistance over the border material within these acceptable limits. The enamel also resists discoloration resulting from staining by the silver in the bus bars. The bus bars are a low frit content, silver containing ceramic material which minimizes the stress induced in the transparency due to the difference between the coefficient of thermal expansion for the bus bar material and the ceramic border and glass.

BRIEF DESCRIPTION OF THE DRAWINGS

FIG. 1 is a schematic view of a windshield incorporating the features of the present Invention.

FIG. 2 is an exploded cross-sectional view through line 2—2 of FIG. 1.

FIG. 3 is an exploded cross-sectional view through line 3—3 of FIG. 1.

DETAILED DESCRIPTION OF THE INVENTION

The description of the invention is presented in connection with a heated laminated transparency comprised of two plies of glass bonded together by an interlayer of plastic, which represents a typical windshield construction, but it should be understood that the invention can apply to heatable transparencies having a single ply of glass or plastic or any other combination involving numerous glass and/or plastic plies. The transparency is not limited for use only as an automotive windshield but may be a transparency for any type land, air, or water vehicle or other enclosure that requires heating capability. FIGS. 1, 2 and 3 show a transparency 20 which includes an outboard glass sheet 22, a plastic interlayer 21, (shown only in FIGS. 2 and 3) which may be polyvinyl butyral as is commonly used for laminated windshields or other suitable interlayer material, and an inboard glass sheet 26 (shown only in FIGS. 2 and 3). An electroconductive coating 28 is preferably placed on the surface of the transparency 20 that is not exposed, most preferably on the inboard surface 30 of the outboard glass sheet 22. Various coatings may exhibit the combination of transparency and electroconductivity required to serve as the heating element for the transparency 20, but a preferred coating is similar to that disclosed in U.S. Pat. No. 4,610,771 to Gillery, which teachings are hereby incorporated by reference. The coating comprises a silver film between a pair of zinc stannate films with, a copper primer between the film layers, each of which may be applied sequentially by magnetron sputtering. The silver acts as the conductive layer and the zinc stannate films serve to mask the reflectance of the silver. The coating exhibits a surface resistivity on the glass surface 30 of approximately 7 to 8 ohms per square when the silver layer has a thickness of approximately 110 angstroms and serves to heat the transparency 20 when electric current is passed through it.

An opaque border 32 such as but not limited to, a ceramic enamel, extends about the marginal edge of the transparency 20 to conceal the bus bars and other elements of the heating circuit when the transparency 20 is viewed from outside the vehicle in which it is installed, through glass ply 22, as will be discussed later, and preferably on surface 30 of glass ply 22. Although not limited in the present invention, in the particular embodiment of the invention illustrated in FIGS. 1, 2 and 3, power is provided to the coating 28 via a bus bar and lead arrangement similar to that disclosed in U.S. Ser. No. 138,008 to Gillery filed on Dec. 28, 1987, which teachings are hereby incorporated by reference. A bottom bus bar 34 and top bus bar 36 are positioned on the border 32 of the glass sheet 22 with inner edges 38 and 40 of the bus bars 34 and 36, respectively, entirely on the border 32 and spaced from border inner edge 42 so that the coating 28 must extend over border inner edge 42 and a border portion 44, as shown in FIG. 2, to make electrical contact with the bus bars. Although not limiting in the present invention, the bus bar material is preferably a silver containing ceramic material.

Electrical connection from a power source 46 to the top bus bar 36 includes leads 48 and 50. In the particular embodiment of the invention illustrated in FIGS. 1, 2 and 3, the leads 48 and 50 are positioned on border 32 and include conductive strips 54 and 56, respectively, extending in opposite directions along the bottom edge of the transparency 20 from a terminal area 58 (shown only in FIG. 1) and side strips 60 and 62, extending along opposite side portions of the transparency 20 and connected to strips 54 and 56, respectively. End 64 of strip 60 and end 66 of strip 62 are electrically interconnected to the opposing ends of the top bus bar 36. Electrical connection to the bottom bus bar 34 may be made in a similar fashion via lead 68. The leads 48 and 50 are electrically insulated from the coating 28 and bottom bus bar 34 in any convenient manner, such as, for example, by limiting the coating 28 on surface 30 to that area of the glass ply 22 within a boundary area 52. Referring to FIG. 2, the coating 28 extends over the bottom bus bar 34 but is spaced from the lead 48. Similarly, referring to FIG. 3, the coating 28 extends over a portion of border 32 but is spaced from lead 48.

Electrical connection from the power source 46 to the heatable windshield is preferably made along the lower edge at terminal area 58 (shown only in FIG. 1) although it should be understood that the connections could be made at any edge and at any location along an edge. Electrical lead 70 connects the bottom bus bar lead 68 to one pole of the electrical power source 46 and leads 48 and 50 leading to the bus bar 36 may be wired in common to the opposite pole, for example, by means of a jumper wire 72 and lead As discussed earlier, because the coating 28 must extend partially over border 32, there is a potential for overheating. It has been determined that smoothness of the border material after it has been heated and fused onto the surface 30, i.e., fired, directly affects the surface resistance of the coating 28 over the border 32, and thus the ability of the coating 28 to effectively conduct current over the border 32 to the remaining portions of the coating 28 for heating the central area of the transparency 20, as well as increasing the coating temperature over the border 32. Smoothness of a surface is defined as the surface irregularities, for example, as seen under magnification by a scanning electron microscope. Referring to FIG. 2, the coating 28 is applied over portion 44 of the border 32 between the bus bars 34, 36 and glass sheet surface 30. A rough border surface increases the surface resistance of the coating 28 over the portion 44, i.e., the surface resistance of the coating 28 over portion 44 of the border 32 is higher than the surface resistance of the coating 28 on the glass surface 30. As a result, when electrical current passes from a bus bar to the coating 28, the portion of the coating 28 over portion 44 restricts current flow and becomes hotter than the remaining portions of the coating 28 which, in turn, may lead to overheating and possible damage to the transparency 20.

Furthermore, the reduced current diminishes the effectiveness of the coating 28's heating capability within the border 32. It is believed that this increase in surface resistance over a rough surface is due to the requirement of a coating to conform to the surface of a border during the coating operation. This condition is further aggravated during lamination of the multilayered coating, which may shear the coating layers over the portion 44 as the glass plies of the transparency 20 are pressed together, further forcing the multilayered coating to conform to the surface of border portion 44. As a result, the smoothness of the border 32 should be such that any increase in the surface resistance of the coating 28 over the border 32 is minimized. Testing has shown that an increase in surface resistance of the coating 28 over border portion 44 of about 50% or less than the surface resistance of the coating 28 covering surface 30 provides acceptable heating of the transparency 20. In the preferred embodiment of the invention, the surface resistance increase is about 20% or less which provides a more uniform heating of the transparency 20, i.e. reduces the chances for high temperature "hot spots" along the ceramic border 32 and reduces the potential for thermally induced breakage.

The surface smoothness of the border 32 can be increased by heating it at a sufficiently high temperature and for a sufficient length of time to ensure adequate melting of all its materials. However, prolonged exposure to excessive heat will cause optical distortion to the glass sheet, e.g., roll ripple, making it unusable as a vehicle transparency. As a result, a major concern in determining the proper border material for the transparency 20 requires that the border material have a sufficient smoothness prior to applying coating 28 so as to reduce the coating's surface resistance increase over the border portion 44 and thus reduce overheating of the coating on the border 32 and allow adequate current flow to the coating 28, as well as providing a material that can be fired to produce the necessary smoothness at temperature and time parameters that do not adversely affect the optical properties of the glass sheet. It would be obvious to one skilled in the art that as the firing time increases, required temperature can be reduced. However, from a production standpoint, it is more advantageous to minimize the heating time to maximize output.

There are various indicators of surface smoothness. One particular indicator is the measure of the surface reflectance, or gloss, using a glossmeter which measures specular reflectance off a surface and compares it to a standard base-line reflection level. One type of glossmeter that may be used to measure surface smoothness, in terms of gloss units, is a Glossgard ® glossmeter available from Gardner Laboratory Division of Pacific Scientific, Maryland, which measures gloss based on ASTM D 523 testing procedures and standards.

Another problem experienced when bus bar material is placed over the border 32 is what is commonly referred to as "bleed-through" which occurs when the silver ions in the bus bar material migrate into, i.e. stain, the ceramic enamel border 32 and/or glass sheet 22 during heating so that there is a discoloration when viewing the transparency 20 from the outside through glass sheet 22. This condition is particularly noticeable when the border 32 is a conventional windshield border enamel which is typically applied to surface 76 of glass sheet 26. When conventional windshield enamels are used on interior surface 30 of glass sheet 22 coated with an overlying silver containing bus bar material and subsequently subjected to elevated temperatures during firing of the bus bar material and/or bending of the glass skeet, typically in the range of about 1050° F. to 1250° F. (566° C. to 677° C.), the reheated enamel becomes soft and fluid, allowing the staining process to continue. In addition, the enamel becomes sticky so that the border will stick to a press face or an overlaying glass sheet during a glass sheet shaping operation, as will be discussed later. It has been found that bleed-through can be reduced by using tempering enamels which are enamels that can better survive exposure to high temperatures and in particular to glass sheet bending temperatures and do not become too soft or fluid during firing of the bus bars or during bending of the glass plies. Bleed-through is further reduced by drying the border material immediately after application and/or by firing the ceramic border material prior to applying the bus bar material to establish a hard ceramic barrier between the materials. It should be noted that subsequent heating of the border enamel such as during firing of the bus bar material will increase the gloss of the ceramic border. However, repeated firing of the transparency tends to increase the stresses in the glass/ceramic/bus bar cross-section due to repeated thermal cycling and the mismatch of the coefficient of expansion between the bus bar and the glass/ceramic layer, as will be discussed later.

With respect to the stresses in the glass/ceramic/bus bar cross-section, it has been observed that excessive stress at the interface between the bus bar and glass/ceramic layer during heating of the transparency 20 can cause the glass to crack. This stress is due in part to the difference in the coefficient of thermal expansion between the bus bar material (principally silver) and the glass/ceramic layer (the coefficient for the glass and the ceramic border are about the same and the coefficient for silver is about twice that of the glass/ceramic layer) and the strength of the bond between the bus bar and the glass/ceramic layer. The bond strength in turn depends on the amount of frit in the bus bar material and the firing conditions. Increasing the frit content ill the bus bar increases the amount of frit that is fused to the glass substrate which in turn increases the bond strength. Increasing the firing temperature promotes a more thorough melting of the frit in the bus bar material and also increases the bond strength. As the bond strength increases, the stress at the bus bar interface due to differential expansion increases. To lessen the bond, bus bar materials with reduced amounts of frit can be used and/or the materials can be heated to lower temperatures.

The stresses at the bus bar and glass/ceramic interface are also affected by the rigidity of the bus bar. An increase in the bus bar thickness and/or the amount of frit in the bus bar material will increase the structural rigidity of the bus bar and further increase the stress at the interface due to differential expansion.

It has been determined that the problem of cracking due to this difference in the coefficient of thermal expansion is minimized when the glass strength in the vicinity of the ceramic border 32 and bus bars 34 and 36 is maintained at a level of at least 12,000 psi (8.3 NT/cm$^2$), and preferably at least 14,000 psi (9.7 NT/cm$^2$).

In order to provide a transparency 20 with acceptable optical quality that completely hides the bus bars and leads, the border 32 enamel must be one that can be bonded onto the glass ply 22 in a sufficiently short time such that the optics of the glass ply 22 are not degraded due to excessive or prolonged heating while at the same time, require a sufficiently high firing temperature such that the enamel will not become overly soft and/or fluid when subjected to elevated temperatures during subsequent processing, for example, bending of the glass sheet. The surface of enamel must also be capable of providing the necessary smoothness required to maintain any Increase in coating 28 surface resistance within the range as discussed earlier. Furthermore, the enamel must resist discoloration resulting from bleed through of the bus bars. In addition, the glass strength of the transparency 20 should be sufficiently high so as to minimize any cracking of the transparency 20 due to the mismatch of the coefficient of thermal expansion between the bus bar material and the border enamel and glass.

In the preferred embodiment of the invention, the border material is a lead borosilicate tempering enamel, such as O. Hommel 42-841 and 43-000 enamel, available from O. Hommel Corporation, Pennsylvania. When used in combination with a coating 28 which has a surface resistance on surface 30 of approximately 7 to 8 ohms per square, as discussed earlier, it has been found that a measured gloss reading of about 10 gloss units or greater on border portion 44 for these enamels, using a 60° Glossgard ® glossmeter, calibrated to a black standard, provides an acceptable surface resistance increase of 1.4 ohms per square or less, with higher gloss readings providing less surface resistance increase. The bus bar material is preferably a low frit content, silver-containing ceramic material containing approximately 80–90% silver and 1–3% frit, by weight, and a suitable carrying medium. In one particular embodiment of the invention, the bus bar material is 84% silver and 1½% frit, by weight. This bus bar and border material combination completely hides the bus bars 34 and 36 and leads 48 and 50 when viewing the transparency 20 from the outside, i.e., through outer ply 22, while providing the required glass strength and maintaining the surface resistance of the coating 28 over the border 32 within acceptable limits.

Although not limiting in the present invention, in one particular embodiment of the invention, after glass sheet 22 is cut to shape, the border 32 is applied to surface 30 of the glass sheet 22 in any convenient manner such as, for example, screen printing and fused to the glass surface 30 by firing the glass at a temperature between 1100° and 1150° F. for approximately two to three minutes. After firing, the bus bar material is applied over the border 32 in any convenient manner such as, for example, screen printing, and the bus bar material is dried and then fired on the border 32 at a temperature between about 1100° F. to 1125° F. (593° C. to 607° C.) for approximately 2 to 3 minutes. These temperature and time-at-temperature conditions are sufficient to melt the frit materials within the enamel and provide the required gloss, while at the same time maintain acceptable optical properties in the glass sheet 22. As stated earlier, the additional firing cycle of the bus bars will increase the gloss of the ceramic border 32.

The glass sheets 22 and 26 may be shaped in any convenient manner as is known in the art. For example, the sheets may be individually shaped by a press bending operation as described in U.S. Pat. No. 4,666,492 to Thimons et al or the glass sheets may be shaped together on a bending iron (not shown) by gravity sag bending and/or pressing as disclosed in U.S. Pat. No. 4,265,650 to Reese et al, both of which are hereby incorporated by reference. In latter shaping operations, glass sheet 22 is covered with a removable parting medium e.g., talc, that prevents sticking of the glass sheet, ceramic border, bus bars, and leads with an overlying glass sheet. The glass sheet 22 is matched with corresponding glass sheet 26 which has a peripheral configuration slightly smaller than that of outer glass ply 22, so that after the glass sheets are shaped, the edges of the bent glass sheets which form the transparency 20 are aligned. It is believed that the combination of the parting medium and the bus bar and lead configuration prevents the glass sheets 22 and 26 from sticking during the shaping operation. In particular, the bus bars and leads act as a spacer which separates the glass surfaces in the vicinity of the ceramic band.

After shaping, the glass sheets are separated, the parting medium is removed and coating 28 is applied to surface 30 of glass sheet 22 in any convenient manner well known in the art, such as that disclosed in U.S. Pat. No. 4,610,770.

After coating, the transparency 20 is assembled, placing interlayer sheet 24 between the bent glass sheets 22 and 26 and laminating the assembly into a unitary structure, in any convenient manner well known in the art.

The present invention provides a heatable transparency and in particular a heatable windshield that completely hides the bus bars and leads behind a ceramic enamel border when viewing the windshield through its outer glass ply while at the same time providing acceptable optics. In addition, the materials used in the ceramic enamel border and bus bars are matched so as to minimize the potential for glass cracking in the area of the border and overlaying bus bars due to stresses resulting from the differences in the coefficient of thermal expansion of the materials at the bus bar and glass/ceramic border interface. Surface resistance of the electroconductive coating over the ceramic border is maintained at a level that will provide acceptable heating of the transparency when electric current passes through the heating coating.

The form of the invention described in this disclosure represents an illustrative embodiment thereof. It is understood that various changes may be made without departing from the teachings of the invention defined by the claimed subject matter which follows.

We claim:

1. An electrically heatable transparency comprising:
   a rigid substrate;
   a border bonded to a surface of said substrate and extending along at least a portion of the periphery of said substrate;
   a pair of opposing electroconductive bus bars spaced from each other wherein at least one of said bus bars is bonded to a portion of said border such that an inner edge of said bus bar is positioned entirely on said border and an inner portion of said border is uncovered by said bus bar; and
   an electroconductive coating having a predetermined surface resistance, interconnecting said bus bars such that a portion of said coating covers said substrate surface, said inner portion of said border, and said bus bars wherein the increase in surface resistance of said coating covering said inner portion of said border is in the range of about 50% or less than the surface resistance of said coating covering said surface of said substrate.

2. The transparency as in claim 1 wherein said increase in surface resistance of said coating covering said inner portion of said border is in the range of about 20% or less than the surface resistance of said coating covering said rigid substrate surface.

3. The transparency as in claim 2 wherein said inner portion of said border has a sufficient smoothness to maintain said surface resistance of said coating over said inner portion of said border area within said range.

4. The transparency as in claim 3 wherein said bus bar is a low frit content, silver containing ceramic material.

5. The transparency as in claim 3 wherein said border is a lead borosilicate enamel which minimizes discoloration of said border enamel and/or said rigid substrate by said bus bar material such that said border enamel hides said bus bar material when said border is viewed through said rigid substrate.

6. The transparency as in claim 5 wherein said border is a tempering enamel.

7. The transparency as in claim 5 wherein said inner portion of said border area has an equivalent gloss of approximately 10 gloss units or more.

8. The transparency as in claim 5 wherein said border extends around the periphery of said transparency and both of said bus bars overlay said border and further including at least one electroconductive lead extending from one of said bus bars along a side portion of said transparency and overlaying said border such that said border hides both of said bus bars and said lead when said border is viewed through said rigid substrate.

9. The transparency as in claim 8 wherein said transparency includes additional transparent substrates secured to said rigid substrate to form a laminated assembly.

10. The transparency as in claim 9 wherein said rigid substrate is a first rigid substrate and said additional substrates include at least one additional rigid substrate secured to said first rigid substrate such that said border, bus bars, and coating are between said first rigid substrate and said additional rigid substrate.

11. The transparency as in claim 10 wherein said transparency is a windshield.

12. The transparency as in claim 11 wherein said rigid substrates are glass and the strength of said glass in the vicinity of said border and overlaying bus bars is at least 12,000 psi so as to minimize cracking of said glass due to the difference in the coefficient of thermal expansion between said bus bar material and said glass coated with said border enamel.

13. In an electrically heatable transparency of the type having a ceramic border bonded to a glass ply of said transparency, electroconductive bus bars bonded to said border and an electroconductive coating bonded to said glass ply and interconnecting said bus bars, the improvement comprising:

said bus bar being a low frit content, silver containing bus bar material containing approximately 80-90% silver and 1-3% frit, by weight to reduce stresses within said transparency resulting from the difference between the coefficient of thermal expansion of said bus bar material and said ceramic border and glass ply.

14. The transparency as in claim 13 wherein said bus bar material includes approximately 84% silver and 1.5% frit, by weight.

15. A method of fabricating a heatable transparency comprising:

cutting a rigid substrate to a desired shape;

bonding an opaque border having a first and second portions to a surface of said substrate along at least a portion of the substrate's periphery;

bonding a first electroconductive bus bar to said first portion of said border wherein said second portion of said border is positioned between said first bus bar and said surface;

bonding a second electroconductive bus bar to said surface or said border wherein said second bus bar is spaced from said first bus bar;

coating said substrate with an electroconductive coating having a predetermined surface resistance, to electrically interconnect said bus bars, wherein a portion of said coating covers said substrate surface, said bus bars, and said second portion of said border; and maintaining any increase in the surface resistance of said coating over said second portion of said border within a range of about 50% or less than said predetermined surface resistance of said coating covering said substrate surface.

16. The method as in claim 15 wherein said maintaining step includes providing a sufficiently smooth surface on said second portion of said border to maintain said increase in said surface resistance of said coating covering said second portion of said border within said range.

17. The method as in claim 16 wherein said maintaining step includes maintaining said surface resistance increase of said coating covering said second portion of said border within a range of about 20% or less than said predetermined surface resistance of said coating covering said substrate surface.

18. The method as in claim 16 wherein said maintaining step includes providing an equivalent surface gloss on said second portion of said border of about 10 gloss units or more.

19. The method as in claim 16 wherein said border bonding step includes applying a discoloration resistant opaque ceramic enamel to said surface about the periphery of said transparency and heating said border enamel to bond it onto said substrate surface while maintaining the optical quality of said substrate.

20. The method as in claim 19 wherein said bus bar bonding steps include applying a low frit content, silver containing ceramic material over said border enamel such that said bus bars are completely on said first portion of said border and heating said bus bar material to bond said material to said border enamel while maintaining the optical quality of said substrate.

21. The method as in claim 20 further including the step of heating said substrate and shaping said substrate to a desired configuration.

22. The method as in claim 21 further including the step of laminating additional substrates to said surface of said substrate.

23. The method as in claim 22 wherein said substrates are glass plies and further including the step of maintaining the glass strength of said glass plies in the vicinity of said border and bus bars at a level of about 12,000 psi or more.

24. An electrically heatable transparency comprising:

a rigid substrate;

a ceramic border bonded to a surface of said substrate and extending along at least a portion of the periphery of said substrate;

a pair of opposing electroconductive bus bars spaced from each other wherein at least one of said bus bars is bonded to a surface portion of said border such that an inner edge of said bus bar is positioned entirely along said border and an inner surface portion of said border is uncovered by said bus bar; and an electroconductive coating, having a predetermined surface resistance, interconnecting said bus bars such that a portion of said coating covers said inner surface portion of said border along the length of said at least one bus bar, wherein said inner surface border portion has a gloss equivalent of approximately 10 gloss units or more so as to provide a sufficient smoothness to maintain a surface resistance of said coating portion covering said inner surface portion of said border within a range of about 50% or less than said predetermined surface resistance.

25. A method of fabricating a heatable transparency comprising:

cutting a rigid substrate to a desired shape;

applying a tempering enamel border having first and second portions to a surface of said substrate along at least opposing marginal edge portions of said substrate;

processing said substrate to bond said border to said substrate such that said border develops a surface having an equivalent surface gloss on at least said second portion of about 10 gloss units or more;

applying a first electroconductive bus bar to said first portion of said border along a first marginal edge portion of said substrate and a second electroconductive bus bar to said first portion of said border along an opposing marginal edge portion of said substrate, wherein said second portions of said border are positioned between said substrate surface and said first and second bus bars, respectively, and further wherein said bus bars are about 80–90% silver and 1–3% frit, by weight;

processing said substrate to bond said bus bars to said border; and coating said substrate with an electroconductive coating having a predetermined surface resistance to electrically interconnect said bus bars, wherein a portion of said coating covers said substrate surface, said bus bars, and said second portions of said border and further wherein any increase in the surface resistance of said coating over said second portions of said border is within a range of about 50% or less than said predetermined surface resistance of said coating covering said substrate surface.

26. The transparency as in claim 1 wherein said inner portion of said border has an equivalent gloss of approximately 10 gloss units or more.

* * * * *